US008065478B2

(12) United States Patent
Norman

(10) Patent No.: US 8,065,478 B2
(45) Date of Patent: *Nov. 22, 2011

(54) PERFORMING DATA OPERATIONS USING NON-VOLATILE THIRD DIMENSION MEMORY

(75) Inventor: Robert Norman, Pendleton, OR (US)

(73) Assignee: Unity Semiconductor Corporation (*) Notice: Subject to any disclaimer, the term of this patent is extended or adjusted under 35 U.S.C. 154(b) by 0 days.

This patent is subject to a terminal disclaimer.

(21) Appl. No.: 12/930,628

(22) Filed: Jan. 11, 2011

(65) Prior Publication Data

US 2011/0107001 A1 May 5, 2011

Related U.S. Application Data

(63) Continuation of application No. 12/803,542, filed on Jun. 29, 2010, now Pat. No. 7,870,333, which is a continuation of application No. 11/478,163, filed on Jun. 28, 2006, now Pat. No. 7,747,817.

(51) Int. Cl.
G06F 12/00 (2006.01)

(52) U.S. Cl. . 711/112; 711/101; 711/202; 711/E12.002; 365/185.1

(58) Field of Classification Search ............... None
See application file for complete search history.

(56) References Cited

U.S. PATENT DOCUMENTS 7,747,817 B2 * 6/2010 Norman ............ 711/112
7,870,333 B2 * 1/2011 Norman ............ 711/112

* cited by examiner

Primary Examiner — Reginald Bragdon
Assistant Examiner — Eric Loonan

(57) ABSTRACT

Performing data operations using non-volatile third dimension memory is described, including a storage system having a non-volatile third dimension memory array configured to store data, the data including an address indicating a file location on a disk drive, and a controller configured to process an access request associated with the disk drive, the access request being routed to the non-volatile third dimension memory array to perform a data operation, wherein data from the data operation is used to create a map of the disk drive. In some examples, an address in the non-volatile third dimension memory array provides an alias for another address in a disk drive.

20 Claims, 8 Drawing Sheets

US 8,065,478 B2

PERFORMING DATA OPERATIONS USING NON-VOLATILE THIRD DIMENSION MEMORY

FIELD OF THE INVENTION

The present invention relates generally to semiconductors. More specifically, performing data operations is described.

BACKGROUND OF THE INVENTION

Memory systems include memory interfaces that enable data to be read and written from a memory device. Conventional memory systems (e.g., hard disk, disk drive, disk array, and the like) perform data operations (e.g., read, write) on binary data stored in memory. Disk interfaces enable other devices to access and use binary data stored in memory cells. Conventional memory systems use electromechanical systems to perform data operations (e.g., read, write), but are often restricted by the physical dimensions, configuration, and movement of various components.

FIG. 1 illustrates a conventional disk drive system 100. Conventional disk drive system 100 includes servo tower 102, servo motor 104, servo drive apparatus 106, head arms 108-112, heads 114-118, platters 120-124, spindle shaft 126, spin motor 128, spin motor arm 130, and spin drive apparatus 132. Each of platters 120-124 stores data on rings called "cylinders," which extend vertically across platters 120-124. Each platter is divided into n cylinders, including cylinder 0 (e.g., 134-138) and cylinder n (e.g., 140). Each platter is read and written separately by heads 114-118, each of which accesses data from platters 120-124, respectively. Heads 114-118 electromechanically access the same cylinder simultaneously. Servo motor 104 moves servo tower 102, which moves heads 114-118 simultaneously across cylinders 134-140. The mechanical operation of servo tower 102, servo motor 104, and servo drive apparatus 106 is controlled by a processor that sends electrical signals to direct forward or backward motion of head arms 108-112 and heads 114-118 across cylinders 120-124. However, conventional disk drive system 100 is limited by latencies incurred by size and the movement of various electromechanical/mechanical components.

FIG. 2 illustrates a block diagram of a conventional disk drive configuration. Conventional implementation 200 includes processor 202, read only memory (ROM) 204, static random access memory (SRAM) 206, disk controller 208, disk interface (I/F) 210, dynamic random access memory (DRAM) 212, analog read/write servo power drivers 214, servo power drivers 216, and spin motor power drivers 218. SRAM is a type of memory technology that is fast, does not degrade over time, but is volatile (requires a power source to maintain stored data). SRAM requires a battery backup to ensure power is constantly supplied, which leads to increased costs, size, maintenance, and unreliability (i.e., potential simultaneous AC power and battery failure would result in stored data being lost). DRAM experiences problems when refreshing stored data and operating under high power requirements. Flash memory is another type of memory that is non-volatile (i.e., maintains data stored in memory when removed from a power source), but has limited endurance (i.e., gradually loses its stored data in memory over time when operations (e.g., read, write) are "cycled" (i.e., performing a read operation followed by a write operation or vice versa), especially in environments requiring large numbers of accesses. Flash also requires erasing its memory before performing a write operation, which in turn requires a Flash operating system (i.e., a separate application or program) to manage data operations. Additionally, a "shadow" memory (e.g., SRAM) would also be required as a temporary store for data to be erased prior to performing a write operation. When data is erased prior to a write operation, some of the original data may need to be re-written to the Flash memory, which can create erase and write times that are longer than those for a hard disk drive. Conventional implementation 200 is used with conventional disk drive system 100 described above in connection with FIG. 1.

To read or write data, a command signal is sent from a host (not shown) through disk interface 210 to disk controller 208. Processor 202 evaluates the command signal and determines the cylinder or set of cylinders where the desired data is located. Once a location has been determined, processor 202 initiates movement of servo tower 102 and positions heads 114-118 over the desired cylinder. After mechanically positioning heads 114-118, a data operation is performed to read or write data from/to the selected cylinder. Data is then transferred from the cylinder through disk interface 210 to disk controller 208, which sends data to DRAM 212 for performing ECC checks and corrections before sending the data over disk interface 210. Conventional systems also use operating systems (e.g., Windows®, UNIX®) to manage (e.g., data produced from read, write operations) information.

When a file is stored, an operating system records the file name in a directory file. The directory file is typically stored on the first cylinder of a platter and points to a file allocation table (FAT), which contains the location of the desired data file. FATs include pointers (i.e., cylinder, head sector) to locations for data blocks (i.e., a file may be stored in data blocks in different locations on a platter) of a file. FATs are continuously accessed by an operating system, which is typically located on the first cylinders of a platter (e.g., cylinders 134-138). This requires moving servo tower 102, head arms 108-112, and heads 114-118 continuously between the first cylinders and the cylinders where a data operation is to be performed. In conventional implementations, a performance bottleneck results from the delays caused by the mechanical action and settling times of conventional memory systems.

Continuing efforts are being made to improve memory systems.

BRIEF DESCRIPTION OF THE DRAWINGS

Various embodiments of the invention are disclosed in the following detailed description and the accompanying drawings.

It is to be understood that the depictions in the FIGs are not necessarily to scale. Although various examples of the invention are disclosed in the accompanying drawings, the invention is not limited to those specific examples.

DETAILED DESCRIPTION

The invention can be implemented in numerous ways, including as a system, a process, an apparatus, or a computer readable medium such as a computer readable storage medium or a computer network wherein program instructions are sent over optical or electronic communication links. In general, the steps of disclosed processes may be performed in an arbitrary order, unless otherwise provided in the claims.

A detailed description of one or more embodiments is provided below along with accompanying figures. The detailed description is provided in connection with such embodiments, but is not limited to any particular example. The scope is limited only by the claims, and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

Figure 3:
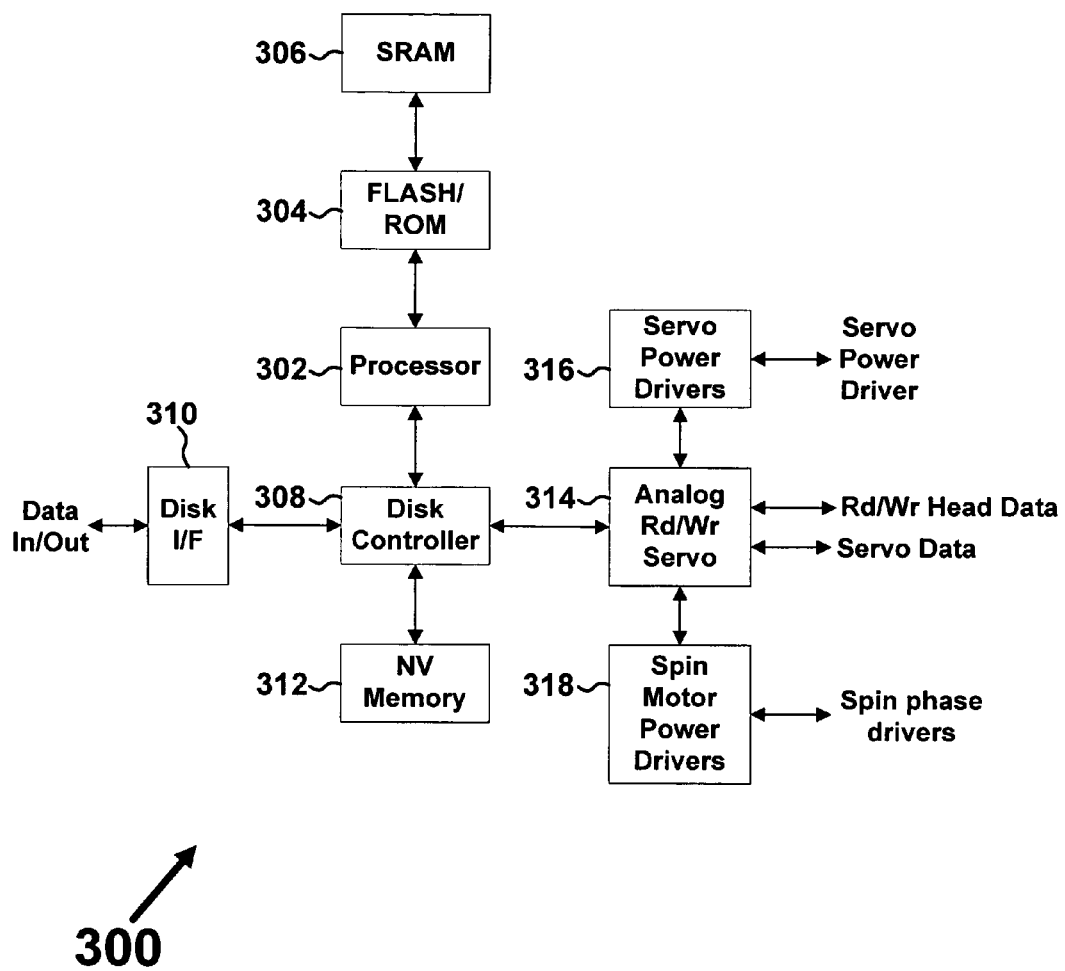
FIG. 3 illustrates an exemplary system for performing data operations using non-volatile third dimension memory.

FIG. 3 illustrates an exemplary system for performing data operations using non-volatile third dimension memory. Here, system 300 includes processor 302, ROM 304, SRAM 306, disk controller 308, disk interface (I/F) 310, non-volatile third dimension memory array 312, analog read/write servo power drivers 314, servo power drivers 316, and spin motor power drivers 318. System 300 is a memory system configured to perform various data operations with improved (i.e., decreased latencies resulting from mechanical action of disk drive components). In other examples, system 300 may include more or fewer components. Unlike conventional storage or memory systems, non-volatile third dimension memory array 312 may be used to replace various memory components of system 300 (including DRAM, SRAM, and Flash components) to reduce mechanical action within a disk drive. While primary data blocks for various files may be retrieved using a mechanical disk drive, some components (e.g., directory, FAT) may be accessed using non-volatile third dimension memory array 312 instead. In some examples, non-volatile third dimension memory array 312 may be used as a cache or temporary store for data read from or written to a particular memory location (e.g., DRAM). For example, non-volatile third dimension memory array 312 may be implemented as a DRAM cache in system 300. In some examples, non-volatile third dimension memory array 312 may be implemented and configured differently to achieve fast write operations and high write endurance. For example, non-volatile third dimension memory array 312 may be implemented internally or externally to disk controller 308. In other examples, various materials, designs, and fabrication techniques may be used and are not limited to the examples described. For example, perovskites and other crystalline materials may be used to implement a memory with desirable characteristics.

U.S. patent application Ser. No. 11/095,026, filed Mar. 30, 2005, now Published U.S. Application No. 2006/0171200, and titled "Memory Using Mixed Valence Conductive Oxides," hereby incorporated by reference in its entirety and for all purposes, describes non-volatile third dimension memory cells that can be arranged in a cross point array. The application describes a two terminal memory element that changes conductivity when exposed to an appropriate voltage drop across the two terminals. The memory element includes an electrolytic tunnel barrier and a mixed valence conductive oxide. A voltage drop across the electrolytic tunnel barrier causes an electrical field within the mixed valence conductive oxide that is strong enough to move oxygen ions out of the mixed valence conductive oxides and into the electrolytic tunnel barrier. Oxygen depletion causes the mixed valence conductive oxide to change its valence, which causes a change in conductivity. Both the electrolytic tunnel barrier and the mixed valence conductive oxide do not need to operate in a silicon substrate, and, therefore, can be fabricated above circuitry being used for other purposes (such as selection circuitry). A memory is "third dimension memory" when it is fabricated above other circuitry components, the components usually including a silicon substrate, polysilicon layers and, typically, metallization layers.

The two-terminal memory elements can be arranged in a cross point array such that one terminal is electrically coupled with an x-direction line and the other terminal is electrically coupled with a y-direction line. A stacked cross point array consists of multiple cross point arrays stacked upon one another, sometimes sharing x-direction and y-direction lines between layers, and sometimes having isolated lines. When a first write voltage $V_{W1}$ is applied across the memory element, (typically by applying $½ V_{W1}$ to the x-direction line and $½ -V_{W1}$ to the y-direction line) it switches to a low resistive state. When a second write voltage $V_{W2}$ is applied across the memory element, (typically by applying $½ V_{W2}$ to the x-direction line and $½ -V_{W2}$ to the y-direction line) it switches to a high resistive state. Typically, memory elements using electrolytic tunnel barriers and mixed valence conductive oxides require $V_{W1}$ to be opposite in polarity from $V_{W2}$.

Here, non-volatile third dimension memory array 312 may be included or embedded with disk controller 308. When an operating system accesses a file directory or FAT, a read or write command may be sent to the first few cylinders of a disk drive. In some examples, instead of activating servo power drives 316 to retrieve information from the cylinders on a platter, the data is instead accessed and taken from non-volatile third dimension memory array 312 and sent to a host (not shown). In other words, non-volatile third dimension memory array 312 stores data (e.g., FAT data, cylinder-head-sector (CHS) values, and the like) that has addresses configured as aliases for addresses assigned to a disk drive. When a command to access data on a disk drive is received, the commands is interpreted by disk controller 308 to determine a corresponding aliased address in non-volatile third dimension memory array 312. If the command identifies an address that is included in an aliasing range, a corresponding alias address is used to retrieve data from non-volatile third dimension memory array 312. Once determined, data stored at the aliased address in non-volatile third dimension memory array 312 is retrieved and sent to the host. The host may use this data to perform other data operations. As an example, if disk controller 308 and processor 302 evaluate the read or write commands and determine that a location for a file is requested from a FAT, processor 302 fetches data from non-volatile third dimension memory array 312 (which is mapped to the FAT and provides aliases identifying locations in non-volatile third dimension memory array 312), providing the location of the destination file. This eliminates the need, as in conventional memory systems, to move and settle mechanical servo components over the first few cylinders of a platter where FAT is stored. By using non-volatile third dimension memory array 312 to replicate FAT data, the additional mechanical action (i.e., movement), access times, rotational latency, head settling delays, disk drive size limitations, the number of "seeks" or data lookups from the FAT, and power requirements are reduced.

In some examples, non-volatile third dimension memory array 312 may be mapped to an associated disk. Mapping enables non-volatile third dimension memory array 312 to duplicate the image of the first few cylinders of a platter. By assigning non-volatile third dimension memory array 312, processor 302 retrieves data from a disk drive, which is mapped to non-volatile third dimension memory array 312 using cylinder, head, and sector parameters provided in a read or write command. Processor 302 translates addresses into memory addresses and sequentially fetches the requested data blocks. If a directory or FAT is written to a memory address, the data to be written may be retrieved from a holding buffer within controller 308. The directory or FAT data may then be sequentially written to non-volatile third dimension memory array 312 using a direct memory access (DMA) sequence orchestrated by the controller. DMA is described below in connection with FIG. 7.

Figure 1:
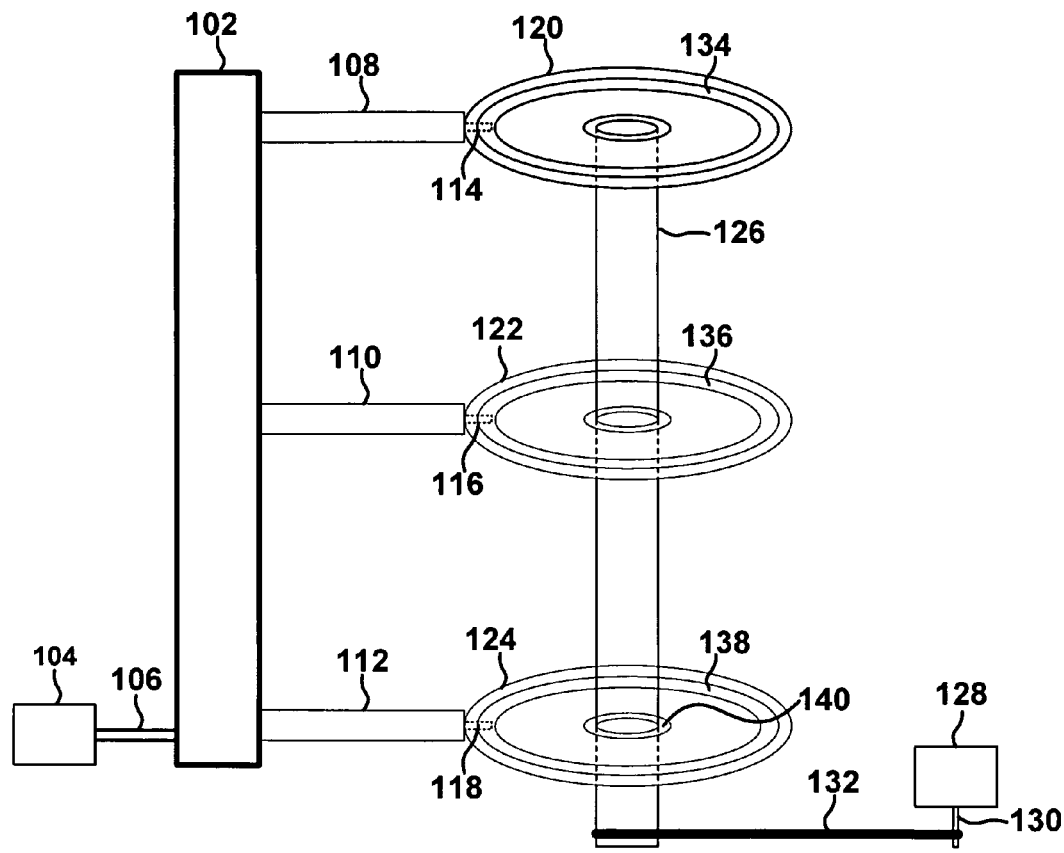
FIG. 1 illustrates a conventional disk drive system.
Figure 2:
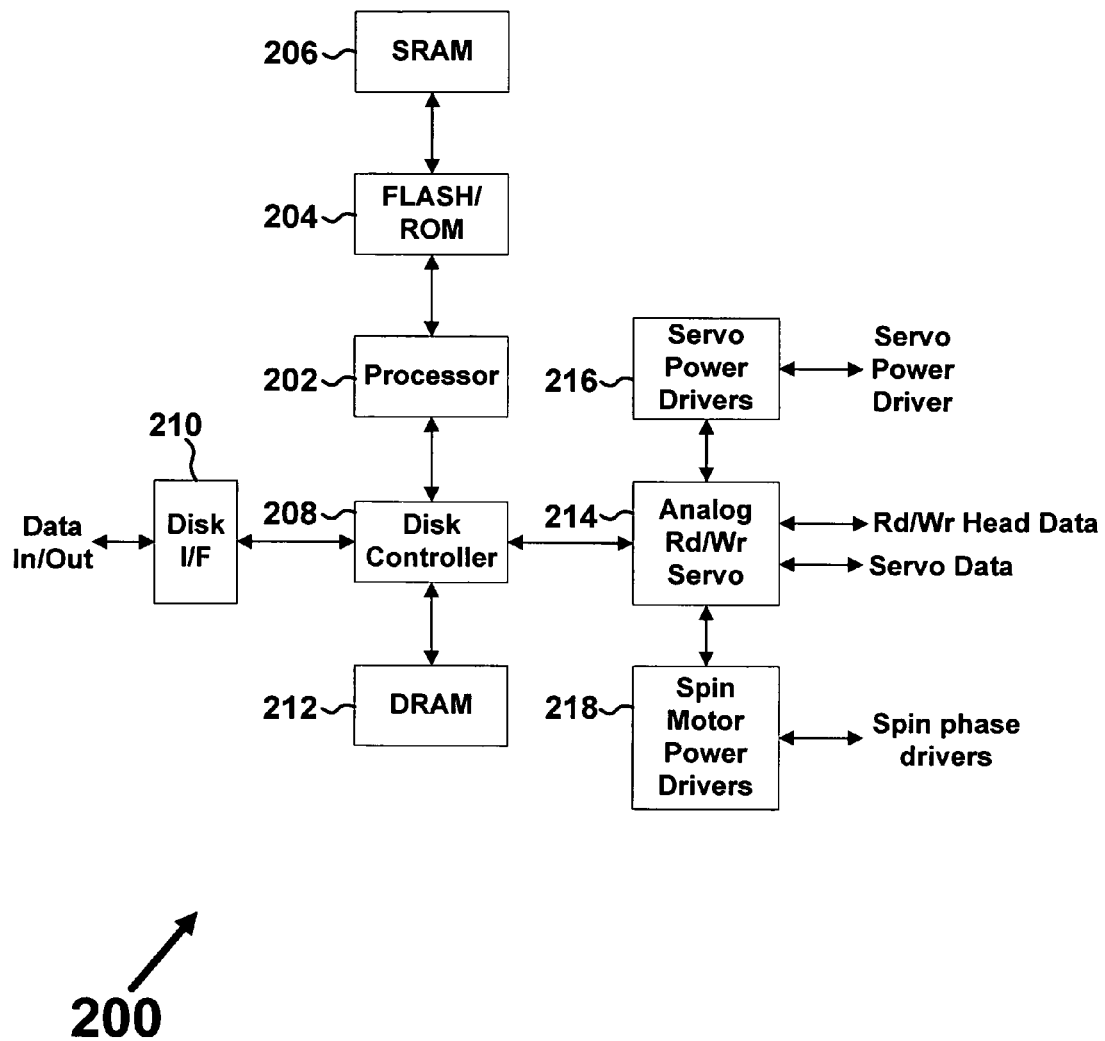
FIG. 2 illustrates a block diagram of a conventional disk drive configuration.

Non-volatile third dimension memory array 312 may be used in various implementations. For example, non-volatile third dimension memory array 312 may be used to replace DRAM typically used to store the data and command packets as shown in FIG. 2. By using a DRAM interface (not shown), non-volatile third dimension memory array 312 may be used to replace DRAM, as shown in this example. In other examples, non-volatile third dimension memory array may be used to replace Flash/ROM 304 used with processor 302.

Figure 4:
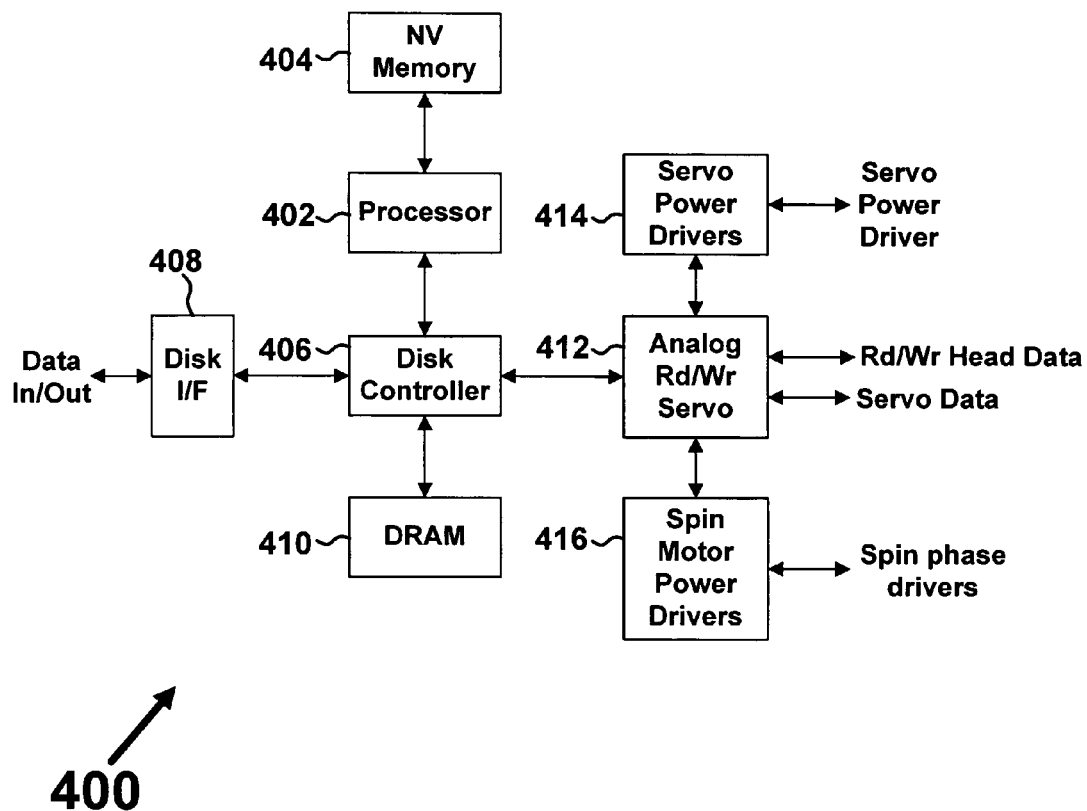
FIG. 4 illustrates an alternative exemplary system for performing data operations using non-volatile third dimension memory.

FIG. 4 illustrates an alternative exemplary system for performing data operations using non-volatile third dimension memory. In some examples, system 400 includes processor 402, non-volatile third dimension memory array 404, disk controller 406, disk interface (I/F) 408, DRAM 410, analog read/write servo power drivers 412, servo power drivers 414, and spin motor power drivers 416. System 400 is storage or memory system that may be used as a replacement, complement, or supplement to a disk drive (e.g., hard disk drive, RAID, and the like). In other examples, system 400 may include more or fewer components. Here, non-volatile third dimension memory array 404 may be used to replace a Flash or ROM component to system 400. Non-volatile third dimension memory array 404 may be used to replace Flash or ROM technologies by combining program memory with cylinder cache tables (e.g., FAT). When processor 402 detects an access request (i.e., command signal) for a cylinder corresponding to FAT, data is accessed, read, or written from disk controller 406. Flash or ROM memory may be replaced by mapping data stored on non-volatile third dimension memory array 404 to an address or location on a cylinder. Instead of retrieving data from Flash or ROM, non-volatile third dimension memory array 404 provides the requested data in response to the access request without requiring additional mechanical action. Likewise, non-volatile third dimension memory array 404 may be used to replace other components of a storage or memory system.

Figure 5:
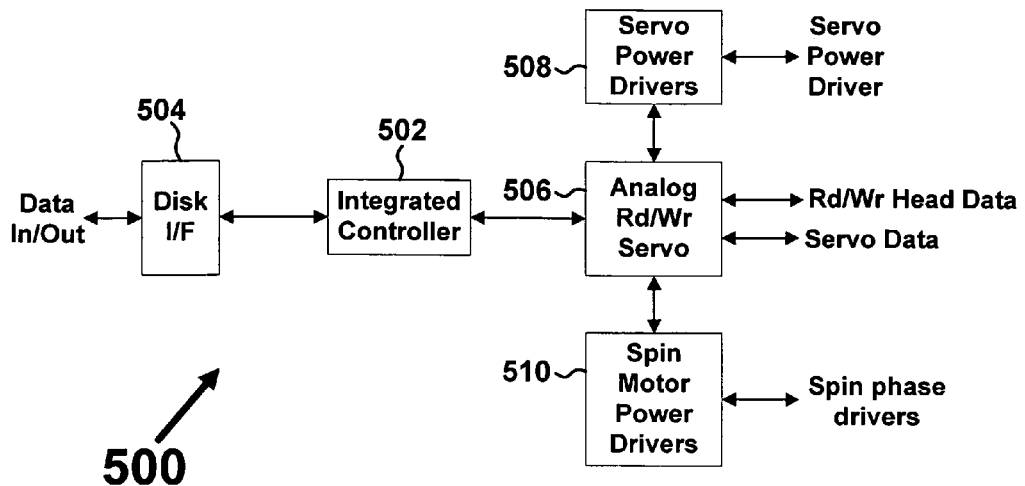
FIG. 5 illustrates another alternative exemplary system for performing data operations using non-volatile third dimension memory with an integrated controller.

FIG. 5 illustrates another alternative exemplary system for performing data operations using non-volatile third dimension memory with an integrated controller. In some examples, system 500 includes integrated controller 502, disk interface (I/F) 504, analog read/write servo power drivers 506, servo power drivers 508, and spin motor power drivers 510. Here, integrated controller 502 combines several functions, including those provided by a disk controller, processor, and, in some examples, various memory devices, systems, or stores (e.g., SRAM, DRAM, Flash, ROM, and the like). Here, a non-volatile third dimension memory array is included (i.e., integrated, embedded) with integrated controller 502, which also includes a processor and disk controller. In some examples, Flash/ROM and SRAM are external to integrated controller 502. In other examples, Flash/ROM and SRAM are included with integrated controller 502. By combining several functions within integrated controller 502, die sizes, mechanical action, power requirements, and other limiting factors in conventional disk drives may be reduced. Additionally, by combining multiple functions into integrated controller 502 may be vertically configured, as described in greater detail below in connection with FIG. 6.

Figure 6:
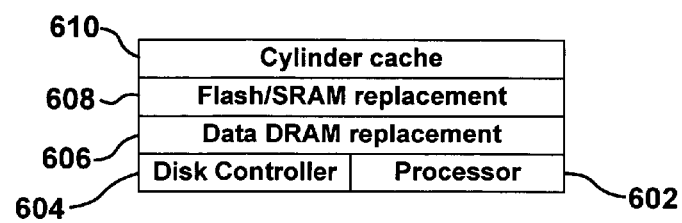
FIG. 6 illustrates an exemplary diagram of an integrated controller configured to perform data operations using non-volatile third dimension memory.

FIG. 6 illustrates an exemplary diagram of an integrated controller configured to perform data operations using non-volatile third dimension memory. In some examples, an integrated controller (e.g., integrated controller 502 of FIG. 5) may be implemented by using a vertical chip configuration. "Chip" may refer to a semiconductor system, integrated circuit, application-specific integrated circuit, or other circuit design embedded on a wafer or substrate. Here, chip 600 includes processor 602 and disk controller 604 formed on a substrate (not shown) or another supportive layer. Layered on top of processor 602 and disk controller 604 are data/DRAM replacement memory 606, Flash/SRAM replacement memory 608, and cylinder cache (e.g., Flash/ROM) 610. In some examples, data/DRAM replacement memory 606, Flash/SRAM replacement memory 608, and cylinder cache (e.g., Flash/ROM) 610 are layers that may be replaced using a non-volatile third dimension memory array such as that described above in connection with FIG. 3. The die size of chip 600 may be reduced by vertically configuring various memory systems to reduce the overall die size.

In some examples, the die size of chip 600 is determined by the die size of an included disk controller included, which may allow large blocks or planes of memory to be vertically disposed (e.g., on top of, underneath, stacked) relative to the disk controller. For example, a non-volatile third dimension memory plane may be used to replace Flash/ROM memory. In still another example, a non-volatile third dimension memory plane may replace SRAM memory. Another non-volatile third dimension memory plane may be used to replace DRAM used for data passing and the cylinder cache. In other examples, individual non-volatile third dimension memory planes may be used to implement data passing and cylinder caching functions independently. In some examples, non-volatile third dimension memory planes may be shared. For example, SRAM and Flash memory may be replaced by a single memory plane, a set of sub-planes, or divided blocks on a plane.

Figure 7:
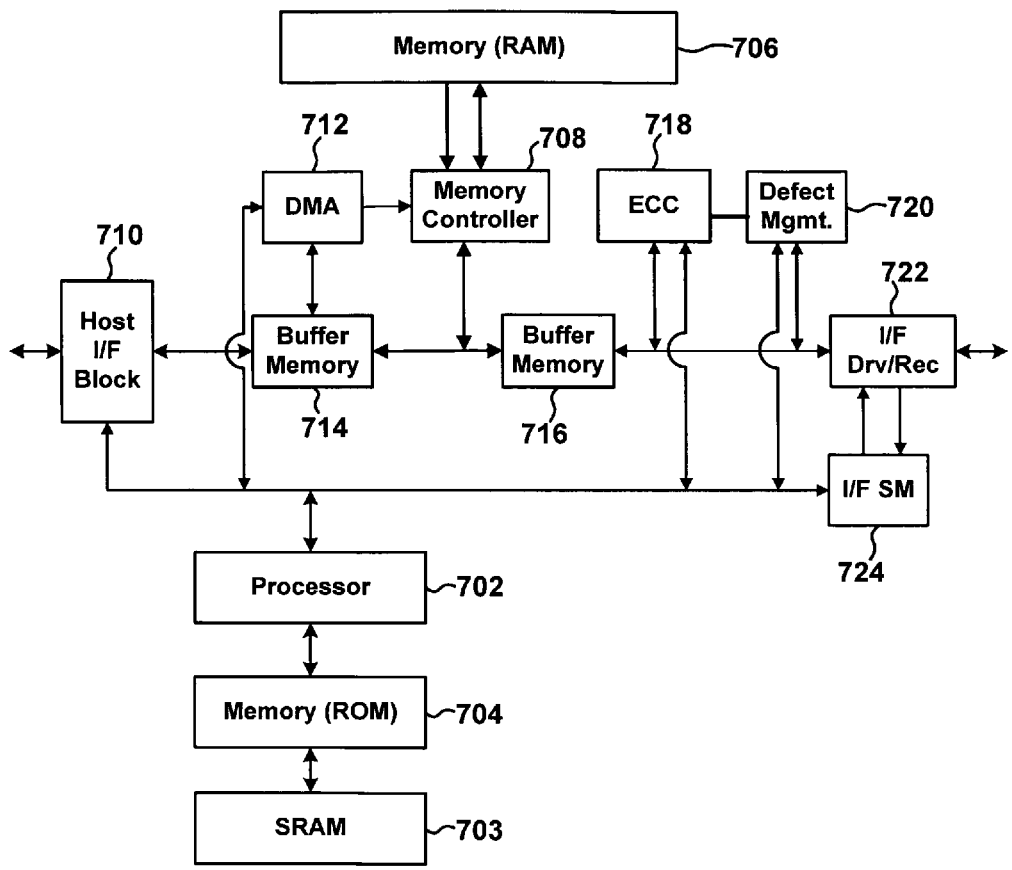
FIG. 7 illustrates an exemplary controller configured to perform data operations using non-volatile third dimension memory.

FIG. 7 illustrates an exemplary controller configured to perform data operations using non-volatile third dimension memory. Disk controller 700 may be used as a component in a system configured to perform data operations using non-volatile third dimension memory, such as those described above in connection with FIGS. 3, 4, and 5. Disk controller 700 may be fabricated using memory systems that enable data to be read or written from/to various memory locations. Here, disk controller 700 includes processor 702, SRAM memory 703, read only memory (ROM) 704, random access memory (RAM) 706, memory controller 708, host interface (I/F) block 710, direct memory access (DMA) block 712, buffer memories 714-716, error correction code (which may also be referred to as error checking and correction or ECC) 718, defect management block 720, disk interface 722, and interface (I/F) state machine (SM) 724. In some examples, buffer memories 714-716 may be small buffers used for speed matching between host I/F block 710 and disk I/F 722, which transfers driving and receiving signals between controller 700 and a disk in a storage system (not shown). Buffer memories 714-716 may be implemented as a first-in, first-out (FIFO)-type buffer. In other examples, buffer memories 714-716 may be implemented differently. Memory in disk controller 700 may be implemented as RAM, ROM, dynamic random access memory (DRAM), static/dynamic random access memory (SDRAM), or other technologies. Buffer memories 714-716 may also be implemented to temporarily store and access data while disk controller 700 is operating (i.e., receiving power) enabling faster data processing. Other components are described, including logic for controlling operations that access memory locations throughout disk controller 700.

Components may be referred to as "blocks" or "modules." The various blocks included in disk controller 700 may be used to implement functionality for a storage system that interfaces with various internal memory systems (hereafter "memory") and external devices that are either requesting or storing data in disk controller 700. External devices may include other software or hardware that, through I/F Drv/Rec 722, interfaces with disk controller 700 to retrieve or store data. In other embodiments, more or fewer blocks may be included in disk controller 700. Further, different blocks may be used to implement various types of functionality beyond that described above.

Here, processor 702 provides logic configured to provide controller functions. Software code written in languages such as C may provide instruction sets on how disk controller 700 (i.e., processor 702 and memory controller 708) processes requests to either retrieve or store data from various memory locations in system 702. Other functions performed by processor 702 may include initializing controller logic when power is applied (i.e., "on" voltage is applied), performing diagnostic checks, interpreting commands for memory functions, memory management, ECC-related functions, and others. Processor 702 also interprets commands from host I/F block 710 to establish data flow control using DMA block 712. Host I/F block 710 may be used to implement complex functionality that enables disk controller 700 to integrate with other systems, for example, in a computer. Some functions that may be performed by host I/F block 710 include encoding/decoding (e.g., 8-bit/10-bit), scrambling (to reduce electromagnetic interference (EMI)), parity/cyclic redundancy check (CRC)/ECC checking, disparity generation and checking, interface state machine functions, data buffer (e.g., first-in, first-out (FIFO)) buffer, alignment and primitive check and generation (e.g., checks performed on serial interfaces), and others. Some of these functions may also be implemented using other blocks in disk controller 700.

In some embodiments, disk controller 700 may be implemented as a memory card, including memory storage and controller logic. A memory card may be connected to host interface block 710 using an interface connector (not shown). A chip using disk controller 700 may be configured to receive electrical signals from external devices through an interface connector. The electrical signals are interpreted and acted upon depending upon an interface standard (e.g., IEEE) used for command and data passing. Electrical signals may be sent and received to pass data to and from memory 706 via host I/F block 710 and memory controller 708. Host I/F block 710 sends commands and data to memory 706 via DMA 112 and memory controller 708. In some embodiments, memory controller 708 may be implemented as a DRAM controller, which may be used to access, retrieve, and store data in memory 706 while power is being supplied. Memory controller 708 also determines addresses for data stored in memory 706. Addresses may be referenced, for example, based on a row and column reference for a particular cell in a given memory array. By selectively applying voltages to terminals connected to row and column leads, the resistive states of various materials (e.g., ferroelectric, perovskite, and others) used in memory cells may be changed. The resistive states of memory cells may be changed to store data bits (e.g., whether a cell's resistive state indicates a "0" or "1" or, in the case of a four level multi-level memory cell, whether a cell's resistive state indicates a "00" "01" "10" or "11"). In some embodiments, blocks within disk controller 700 may be vertically configured as third dimension memory. For example, memory 704 or memory 706 may be vertically configured relative to the other blocks of disk controller 700. In other embodiments, additional memory controllers or memory locations may be layered in a vertical configuration.

Disk controller 700 may use multiple memory controllers to enable faster data retrieval and storage from various memory locations. In some embodiments, DRAM technology may be used to implement memory 706 and memory controller 708. DRAM uses a "pulse" or refresh voltage in order to retain data in memory while power is on. Memory controller 708 may be implemented using logic that processes data stored in and retrieved from memory 706. In some embodiments, multiple DRAM-based memory controllers may be used in order to increase processing times. In still other embodiments, multiple memory layers of third dimension memory may be used to increase storage capacity. Third dimension memories may include vertically-stacked, crosspoint, two or three-terminal memory arrays fabricated and configured for high-density and fast operation (e.g., read, write) performance. Disk controller 700 may also include logic that determines how data is shared with external devices.

In some embodiments, I/F SM 724 may be configured to send or receive data from an external device indicated by addresses in electrical signals. A "handshake" may be performed with the indicated external device through a I/F Dev/Rec module 722, which acts as a memory interface bus to establish a connection. After establishing a connection between the device and disk controller 700 (via I/F Drv/Rec module 722), data may be passed between memory 704, 706, or 714 (via buffer memories 714-716) to the indicated device. I/F Dev/Rec module 722 works in conjunction with I/F SM 724, which performs handshaking and data flow handling to external devices using data in memory 704 or 706 controlled by disk controller 700. I/F SM 724 may also include other functionality to support interfaces between disk controller 700 and external devices. Devices may also include other processes, logic, circuits, components, or functionality included in an IC.

Memory 704 or 706 may be implemented as third dimension memories to reduce die size. Multiple memory layers may be vertically stacked in order to increase storage capacity of chips without increasing die sizes. Memory 704 and/or 706 and memory controller 708 may be configured to occupy the same die area, but are vertically stacked in layers or "planes." A vertical configuration thereby reduces overall die size, reduces manufacturing and test costs, and increases capacity. This configuration allows multiple planes of memory to be placed on top of or below memory controller 708.

Figure 8:
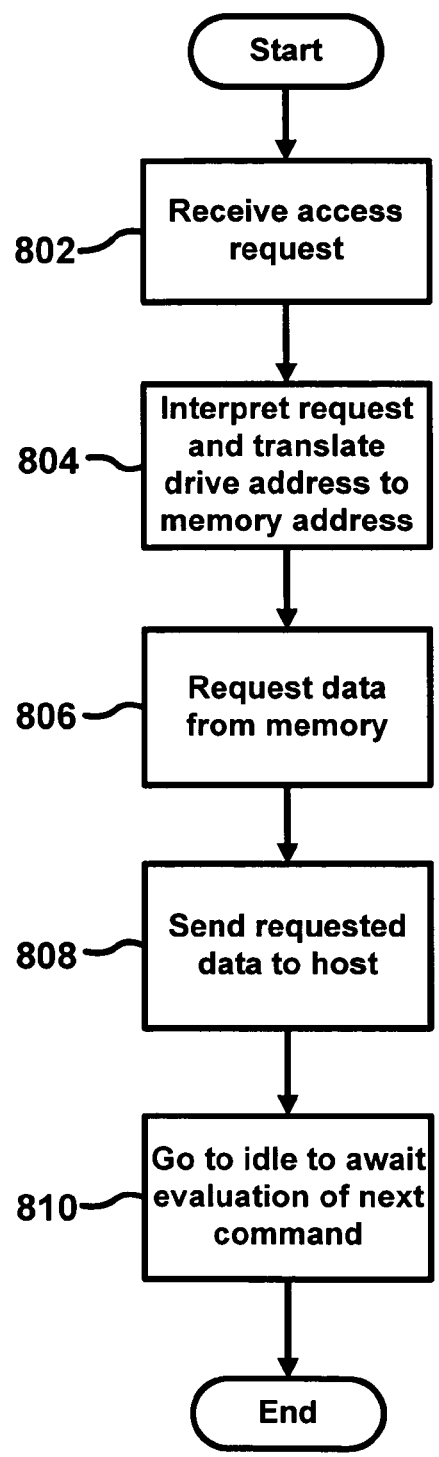
FIG. 8 illustrates a flow chart of an exemplary process for performing data operations using non-volatile third dimension memory.

FIG. 8 illustrates a flow chart of an exemplary process for performing data operations using non-volatile third dimension memory. In some examples, a processor (e.g., processor 302 or 402 and integrated controller 502) may perform the illustrated process to perform data operations using a system where non-volatile third dimension memory arrays replace various memory system components, as described above. Here, an access request is received, which may include a drive address (i.e., an address on a disk drive for a specific data value or set of values) (802). An access request may be a command sent from a host over a disk interface to a processor in order to perform a data operation (e.g., read or write data from a particular file stored in memory). After receiving an access request, instead of directing a servo tower to position head arms and heads over a particular cylinder and sector, the access request is interpreted and a drive address is translated into a memory address (804). In response to the access request, data indicating the address, sequence of data blocks, cylinder, sectors, and other parameters of the requested data is requested and provided from the non-volatile third dimension memory array, instead of from the first few cylinders of a platter (806). This enables the reduction of mechanical action (i.e., movement), access times, rotational latency, head settling delays, disk drive size limitations, the number of "seeks" or data lookups from the FAT, and power requirements. Once data indicating the location of the requested file or set of files has been determined from the FAT, the data is sent to the host (808). Subsequently, the host signals or commands the performance of a desired data operation and the necessary signals are sent to the various drivers (e.g., analog read/write servo power drivers, servo power drivers, and spin motor power drivers, and the like). The processor then enters an idle state and waits for the next command (810). The above-described process may be varied in such ways that more or fewer sub-processes may be implemented. Further, the process is not limited to the implementation example shown. In some examples, the process shown may be implemented as a set of instructions executed in hardware, software, circuitry, or a combination thereof. An exemplary processor configured to execute the described process is described in connection with FIG. 9.

Figure 9:
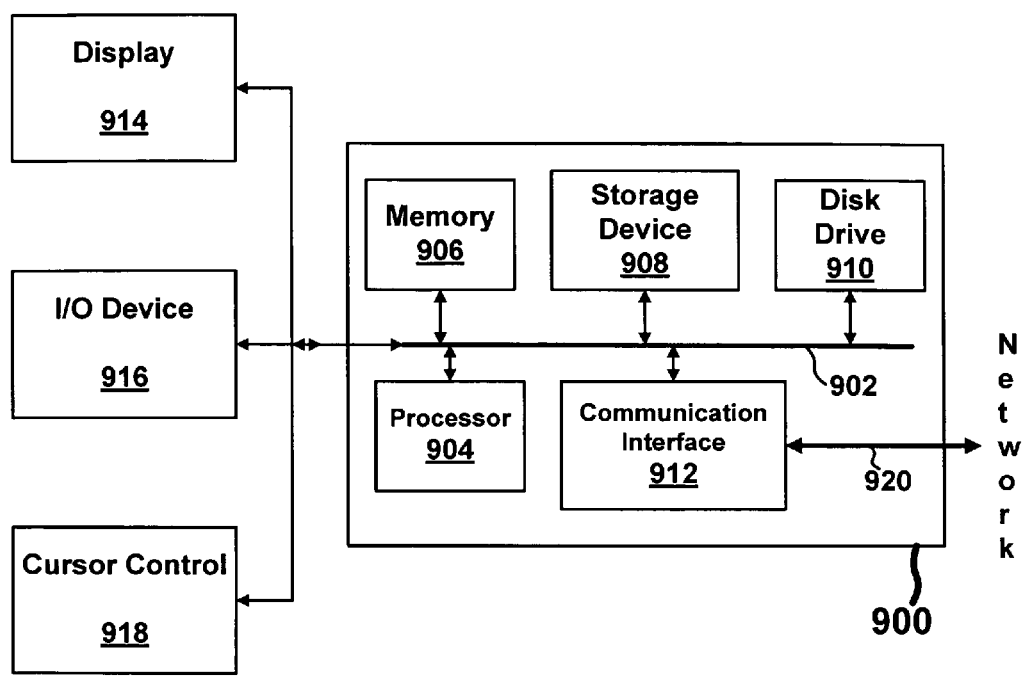
FIG. 9 is a block diagram illustrating an exemplary computer system suitable for performing data operations using non-volatile third dimension memory.

FIG. 9 is a block diagram illustrating an exemplary computer system suitable for performing data operations using non-volatile third dimension memory. In some embodiments, computer system 900 may be used to implement computer programs, applications, methods, or other software to perform the above-described techniques for fabricating storage systems such as those described above. Computer system 900 includes a bus 902 or other communication mechanism for communicating information, which interconnects subsystems and devices, such as processor 904, system memory 906 (e.g., RAM), storage device 908 (e.g., ROM), disk drive 910 (e.g., magnetic or optical), communication interface 912 (e.g., modem or Ethernet card), display 914 (e.g., CRT or LCD), input device 916 (e.g., keyboard), and cursor control 918 (e.g., mouse or trackball).

According to some embodiments of the invention, computer system 900 performs specific operations by processor 904 executing one or more sequences of one or more instructions stored in system memory 906. Such instructions may be read into system memory 906 from another computer readable medium, such as static storage device 908 or disk drive 910. In some embodiments, hard-wired circuitry may be used in place of or in combination with software instructions to implement the invention.

The term "computer readable medium" refers to any medium that participates in providing instructions to processor 904 for execution. Such a medium may take many forms, including but not limited to, non-volatile media, volatile media, and transmission media. Non-volatile media includes, for example, optical or magnetic disks, such as disk drive 910. Transmission media includes coaxial cables, copper wire, and fiber optics, including wires that comprise bus 902. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

Computer system 900 may transmit and receive messages, data, and instructions, including program, i.e., application code, through communication link 920 and communication interface 912. Received program code may be executed by processor 904 as it is received, and/or stored in disk drive 910, or other non-volatile storage for later execution.

Although the foregoing embodiments have been described in some detail for purposes of clarity of understanding, implementations of the above-described system and techniques is not limited to the details provided. There are many alternative implementations and the disclosed embodiments are illustrative and not restrictive.

What is claimed is:

1. A system, comprising:
a bus;
a processor configured to execute instructions stored in a computer readable medium, the processor electrically coupled with the bus;
a communications interface electrically coupled with the bus;
a plurality of non-volatile third dimension two-terminal memory arrays in electrical communication with the bus, each array including a plurality of two-terminal memory elements arranged in a cross-point array configuration and to store non-volatile data as a plurality of conductivity profiles, each two-terminal memory element including an electrolytic tunnel barrier having a thickness less than 50 Å in contact with a mixed valence conductive oxide including mobile oxygen ions that are moveable between the electrolytic tunnel barrier and the mixed valence conductive oxide in response to a write voltage applied across the two-terminal memory element,
a first one of the plurality of non-volatile third dimension two-terminal memory arrays is configured as non-volatile system memory and stores data including the instructions for the processor,
a second one of the plurality of non-volatile third dimension two-terminal memory arrays is configured as a non-volatile storage device, and
a third one of the plurality of non-volatile third dimension two-terminal memory arrays is configured as a non-volatile storage medium operative to replace a hard disk drive (HDD); and
a silicon substrate including access circuitry, disk controller circuitry, the bus, the processor, and the communications interface formed on the silicon substrate, the access circuitry configured to perform data operations on the non-volatile system memory and the non-volatile storage device, the disk controller circuitry is electrically coupled with the access circuitry and the non-volatile storage medium, the disk controller circuitry configured to perform access requests on the non-volatile storage medium in response to HDD commands electrically communicated on the bus, and the non-volatile third dimension two-terminal memory arrays for at least the non-volatile system memory and the non-volatile storage, device are fabricated directly above, the silicon substrate and are electrically coupled with the access circuitry.

2. The system of claim 1 and further comprising: a display in electrical communication with the bus.

3. The system of claim 2, wherein the display is external to the system.

4. The system of claim 1 and further comprising: an input/output (I/O) device in electrical communication with the bus.

5. The system of claim 4, wherein the I/O device is external to the system.

6. The system of claim 1 and further comprising: a cursor control device in electrical communication with the bus.

7. The system of claim 6, wherein the cursor control device is external to the system.

8. The system of claim 1, wherein the communications interface is electrically coupled with an external communication link.

9. The system of claim 1, wherein the non-volatile third dimension two-terminal memory array for the non-volatile storage medium is in contact with and is fabricated directly above the silicon substrate.

10. The system of claim 1, wherein the HDD commands are electrically communicated on the bus by the processor, the communications interface, or both.

11. The system of claim 1, wherein an external communication link is electrically. coupled with the communications interface, the external communication link electrically communicates the HDD commands to the communications interface, and the communications interface electrically communicates the HDD commands on the bus.

12. The system of claim 1, wherein the silicon substrate further includes circuitry configured to perform direct memory access (DMA) on at least one of the plurality of non-volatile third dimension two-terminal memory arrays.

13. The system of claim 1, wherein the non-volatile storage device is operative as a computer readable medium configured to store the instructions used by the processor, and at system power up, the access circuitry reads the instructions from the non-volatile storage device and writes the instructions to the non-volatile system memory.

14. The system of claim 1, wherein the plurality of non-volatile third dimension two-terminal memory arrays comprises a plurality of vertically stacked memory planes that are in contact with one another, are fabricated directly above the silicon substrate, and are electrically coupled with the access circuitry, each memory plane includes at least one two-terminal cross-point array.

15. The system of claim 1, wherein the access circuitry is further configured to replace one or more memory types selected from the group consisting of DRAM, SRAM, ROM, cache, buffer memory, and FLASH memory, and the access circuitry is configured to store data for the one or more memory types in one or more of the plurality of non-volatile third dimension two-terminal memory arrays.

16. The system of claim 1, wherein the access requests comprises a read operation to the non-volatile storage medium.

17. The system of claim 1, wherein the access requests comprises a write operation to the non-volatile storage medium.

18. The system of claim 1, wherein at least a portion of the non-volatile system memory is operative to store non-volatile access data for the access requests on the non-volatile storage medium, and the non-volatile access data comprises one or more types of data selected from the group consisting of a file allocation table (FAT), a disk drive directory, a pointer, a disk drive map, a cylinder cache table, and cylinder-head-sector (CHS).

19. The system of claim 1, wherein the plurality of conductivity profiles stored in each two-terminal memory element are indicative of multi-level data operative to store more than one bit of data.

20. The system of claim 1, wherein the non-volatile storage device is configured as a read only memory (ROM).

* * * * *